US007302478B2

(12) United States Patent
Conrad (10) Patent No.: US 7,302,478 B2
(45) Date of Patent: Nov. 27, 2007

(54) SYSTEM FOR SELF-MONITORING OF SNMP DATA COLLECTION PROCESS

(75) Inventor: Jeff Conrad, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 09/796,704

(22) Filed: Mar. 2, 2001

(65) Prior Publication Data

US 2002/0124078 A1 Sep. 5, 2002

(51) Int. Cl.
*G06F 15/173* (2006.01)
(52) U.S. Cl. .................. 709/224; 709/203; 709/222
(58) Field of Classification Search ........ 709/220–224, 709/237, 203, 235; 702/176
See application file for complete search history.

(56) References Cited

U.S. PATENT DOCUMENTS

| 5,072,376 | A | * | 12/1991 | Ellsworth ................. 718/105 |
| 5,796,633 | A | * | 8/1998 | Burgess et al. ............ 709/224 |
| 5,812,937 | A | * | 9/1998 | Takahisa et al. ........... 455/66.1 |
| 6,006,017 | A | * | 12/1999 | Joshi et al. ................ 709/224 |
| 6,112,015 | A | * | 8/2000 | Planas et al. .............. 709/223 |
| 6,184,886 | B1 | * | 2/2001 | Bates et al. ............... 345/760 |
| 6,237,039 | B1 | * | 5/2001 | Perlman .................... 709/237 |
| 6,317,786 | B1 | * | 11/2001 | Yamane et al. ........... 709/224 |
| 6,404,743 | B1 | * | 6/2002 | Meandzija ................. 709/224 |
| 6,636,983 | B1 | * | 10/2003 | Levi ........................... 714/4 |
| 6,665,716 | B1 | * | 12/2003 | Hirata et al. .............. 709/224 |
| 6,701,363 | B1 | * | 3/2004 | Chiu et al. ................ 709/224 |
| 6,745,229 | B1 | * | 6/2004 | Gobin et al. .............. 709/206 |

\* cited by examiner

*Primary Examiner*—Phuoc Nguyen (57) ABSTRACT

A system for self-monitoring of a data collection function of a network management software executing on a management node. The network management software may be configured to monitor and maintain a computer network, where the self-monitoring data collection module may be configured to retrieve information from remote devices to assess in the maintenance of the network. The self-monitoring data collection module may include a data collection module that may be configured to retrieve information from user-selected remote nodes of a network at scheduled times. The self-monitoring data collection function may also include a self-monitoring module of the network management, which is configured to monitor the data collection module to determine if the data collection module is lagging behind the scheduled data collection. The self-monitoring module may be further configured to determine when the management node is busy collecting data. If the management node is busy, the self-monitoring module may be further configured to compare a system time of the management node with a last idle time of the management node. If the difference is greater than a user-determined time interval, the self-monitoring module may be further configured to notify an alert module to generate an alert or message to a user that the management node is busy.

29 Claims, 7 Drawing Sheets

SYSTEM FOR SELF-MONITORING OF SNMP DATA COLLECTION PROCESS

TECHNICAL FIELD

The invention relates to a management device collecting data from remote devices over a network. More particularly, the present invention relates to improving the timeliness and management of data collection from the remote devices over the network.

DESCRIPTION OF THE RELATED ART

Network communications have become a fundamental part of today's computing. It is not uncommon to find two or more computer systems working together to resolve issues such as simulations, modeling, forecasting, etc. In fact, these efforts have been so successful, users have been inclined to design and implement larger and more powerful networks.

As the networks grow larger, increasingly complex, and interface with a variety of diverse networks, it is the task of a network manager (or administrator/user) to keep track of the devices on the networks, to monitor performances and load, diagnose, and correct problems with the network.

To assist a network manager, network management software may be used in the management of a network. The conventional network management software may be typically executed on a management device or node of the network. From the management node, the conventional network management software may be configured to determine a network topology, detect malfunctioning remote network devices or communication links, monitor network traffic, etc.

As part of the monitoring duties, the network manager may configure the network management software to occasionally query or poll remote network devices for information. The information may include status data, port information, address, etc. The information required may be crucial for the network manager to assess the overall status of the network.

Figure 7:
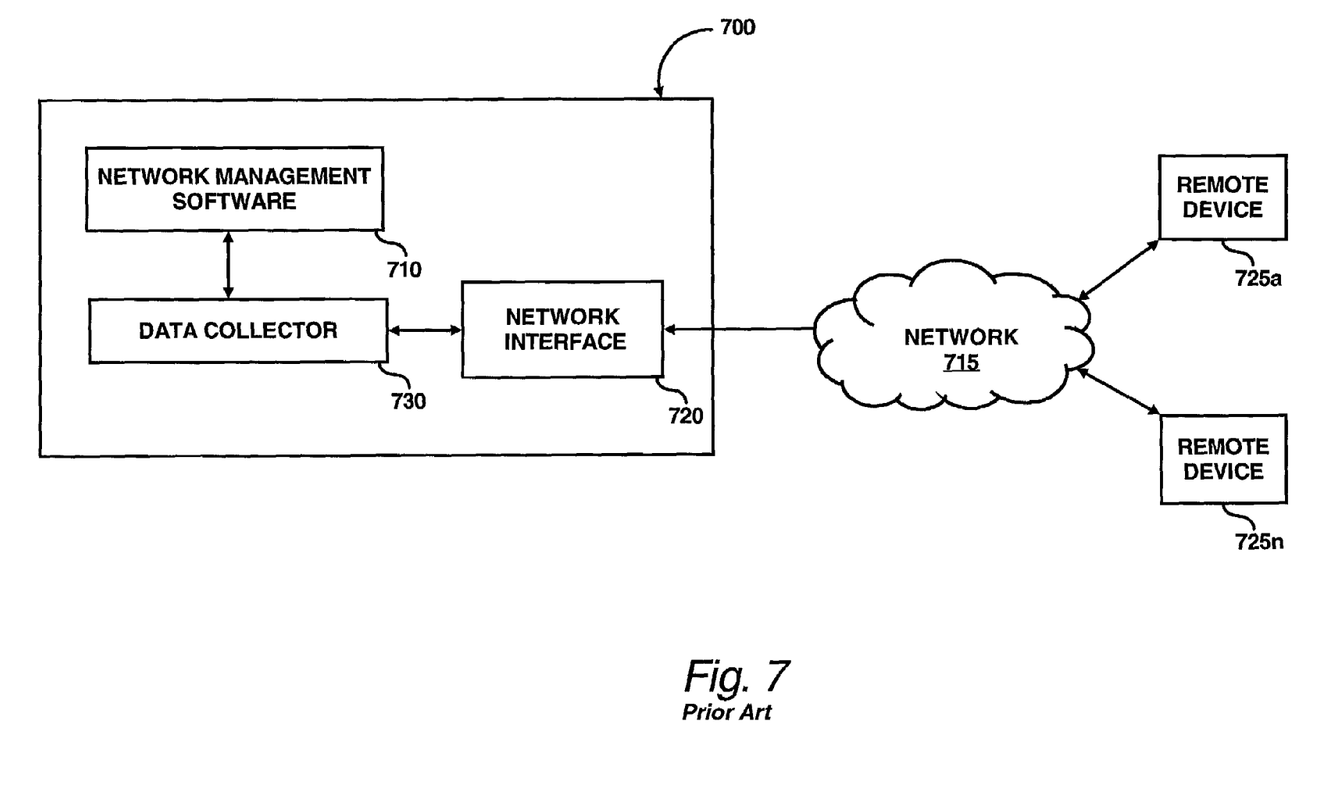
FIG. 7 illustrates a block diagram of a conventional management node or device implementing a conventional data collection from a remote node.

FIG. 7 illustrates a block diagram of a conventional management node or device 700 implementing a conventional data collection from a remote node. In particular, the management node 700 includes a network management software 710 and a network interface 720. The network management software 710 may be configured to provide the functionality for a user, e.g., a network manager, to manage a network 715 through the network interface 720.

The network management software 710 may, among other things, include a data collector module 730 configured to retrieve user specified information at a scheduled time from a plurality of remote devices 725a ... 725n at a scheduled time over the network 715, i.e., a data collection event. The data collector module 730 may retrieve the selected information from at least one of the remote device 725a ... 725n and stores the selected information in an associated output file in the management node 700. The associated output file may be analyzed by additional network tools of the network management software 710 to assist in the assessment of the status and maintenance of the network 715.

A network manager may encounter a degradation of network performance if the network manager configures the data collector module 730 to retrieve user-specified information from too large of a number of remote devices. In retrieving the user-specified information from a remote device, the data collector module 730 may be configured to open a communication channel to the remote device to poll for the requested user-specified information. If there are a large number of channels open, there is a possibility that the network 715 may become congested with traffic, thereby reducing the overall performance of the network 715. Moreover, if the data collector is overloaded, i.e., collecting too much data, the data collector is not able to initiate and process all the requests and responses needed for the requested data collection. Accordingly, data is not collected as frequently by the data collector as configured by the network manager.

The network congestion may have an adverse effect on the data collector module 730. In the event of network congestion during a data collection event, the data collector module 730 may not be able to schedule subsequent data collection interval because of the delay in resolving outstanding data retrieval of the current data collection event.

Moreover, the delay in scheduling may also affect the validity of the collected user-specified information. Typically, a network manager's interest in polling a remote device may be based on a time sensitive nature of the user-specified information contained at the remote device. Thus, if the network management software cannot collect data at the appropriate time, the network manager may have invalid time-critical information in evaluating a network.

A network manager may be able to detect a delay in the data collection function of the network management software by examining a trace file, which records the actions taken by the network management software. However, in order to detect a delay, a network manager would typically go through the trace file manually, which may entail a large time commitment by the network manager. Moreover, the time commitment may be even larger, because trace files typically in a numerical-based format and are difficult to interpret.

Related to network congestion during data collection, a network management software may occasionally experience a surge in the amount of data collected in a scheduled time period. This may be a result of a spike of activity at the remote devices, or the network management software may have scheduled a large number of queries in a given time period. As a result, the network management software may unexpectedly be busy for a short interval of time and may be relatively idle the rest of the time. Conventional techniques of network management may reconfigure the data collection function in response to the busy time, but not take into account the idle time. Accordingly, by unnecessarily reconfiguring the data collection function of the network management software in response to a short busy period of data collection, a network manager may not be collecting sufficient information to assess and monitor a network.

SUMMARY OF INVENTION

In accordance with one aspect, the present invention pertains to a method for monitoring which comprises collecting at least one instance of user-specified information, and assessing a state of the collecting as busy in response to a return of an instance of the information. The method further includes generating an alert message in response to a difference between a current time of the state and a last idle time being greater than a pre-determined busy interval.

One aspect of the present invention is a method for monitoring a process of data collection that includes assessing a state of said process of data collection, and determining a current system time in response to the assessing of the state as busy. The method also includes generating an alert message in response to a difference between a current time of the state and a last idle time being greater than a pre-determined busy interval.

Another aspect of the present invention is a system for monitoring that includes at least one processor, a memory coupled to the at least one processor, and a self-monitoring data collection module. The self-monitoring data collection module is stored on the memory and is executed on the at least one processor, whereby the self-monitoring data collection module is configured to collect at least one instance of user-specified information, assess a state of the collecting as busy in response to a return of an instance of the information, and generate an alert message in response to a difference between a current time of the state and a last idle time is greater than a pre-determined busy interval.

Another aspect of the present invention is a computer readable storage medium on which is embedded one or more computer programs, said one or more computer programs implementing a method for producing monitoring, the one or more computer programs comprising a set of instructions for collecting at least one instance of user-specified information and assessing a state of the collecting as busy in response to a return of an instance of the information. The one or more computer programs further includes generating an alert message in response to a difference between a current time of the state and a last idle time being greater than a pre-determined busy interval.

Additional advantages and novel features of the invention will be set forth in part in the description which follows and in part will become apparent to those skilled in the art upon examination of the following or may be learned by practice of the invention.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. Although the preferred embodiment of the invention may be practiced as a software system, one of ordinary skill in the art will readily recognize that the same principles are equally applicable to, and can be implemented in, a hardware system, and that any such variation would be within such modifications that do not depart from the true spirit and scope of the present invention.

In accordance with the principles of the present invention, an exemplary embodiment of a system for self-monitoring of a data collection function in a network management software is disclosed. The network management software may be configured to monitor and maintain a computer network, where a self-monitoring data collection module may be configured to retrieve information from remote network devices to assist in the maintenance of the network. The self-monitoring data collection module may include a data collection module that may be configured to retrieve information from user-selected remote network devices of a network at scheduled times, a data collection event. The self-monitoring data collection module may also include a self-monitoring module, which is configured to determine if the data collection module is lagging behind the scheduled data collection event. The self-monitoring module may be further configured to determine when the data collection module is collecting data and designating this as a busy state. If the data collection module is in a busy state, the self-monitoring module may be further configured to compare a current system time of the data collection module with a last idle time of the data collection module. If the difference is greater than a user-determined busy interval, the self-monitoring module may be further configured to notify an alert module to generate an alert or message to a user that the data collection module is in a busy state.

Figure 1:
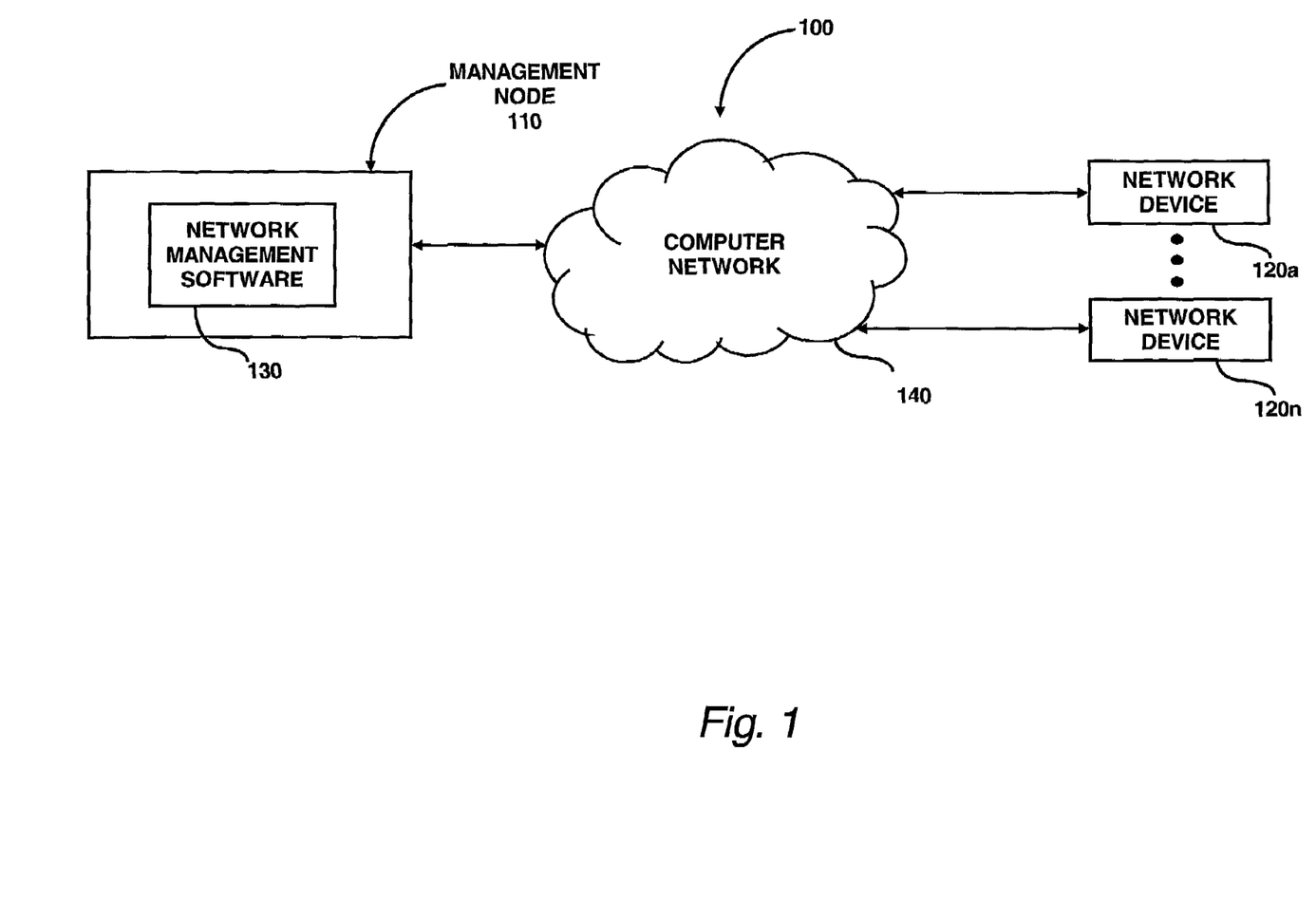
FIG. 1 illustrates a block diagram of a network where an exemplary embodiment of the present invention may be practiced.

FIG. 1 illustrates a block diagram of a network 100 where an exemplary embodiment of the present invention may be practiced. In particular, the network 100 includes a management node 110 interfaced with remote network devices 120a ... 120n and managed by a network management software 130. The management node 110 may be configured to provide network management of the remote network devices 120a ... 120n with the computer network 140. The management node 110 may provide the capability of monitoring, troubleshooting, and/or diagnosing of the remote network devices 120a ... 120n and the computer network 130. The management node 110 may be implemented with a server, a workstation, a personal computer and the like.

The remote network devices 120a ... 120n may also interface with the computer network 140. The remote network devices 120a ... 120n may be a variety of electronic devices such as a printer, a scanner, a server, a workstation, a personal computer, and the like.

The computer network 140 may be configured to provide a communication path between the management node 110 and the remote network devices 120a ... 120n. The computer network 140 may be implemented using network protocols such as Ethernet, token ring, X.25, SNMP, etc.

Figure 2:
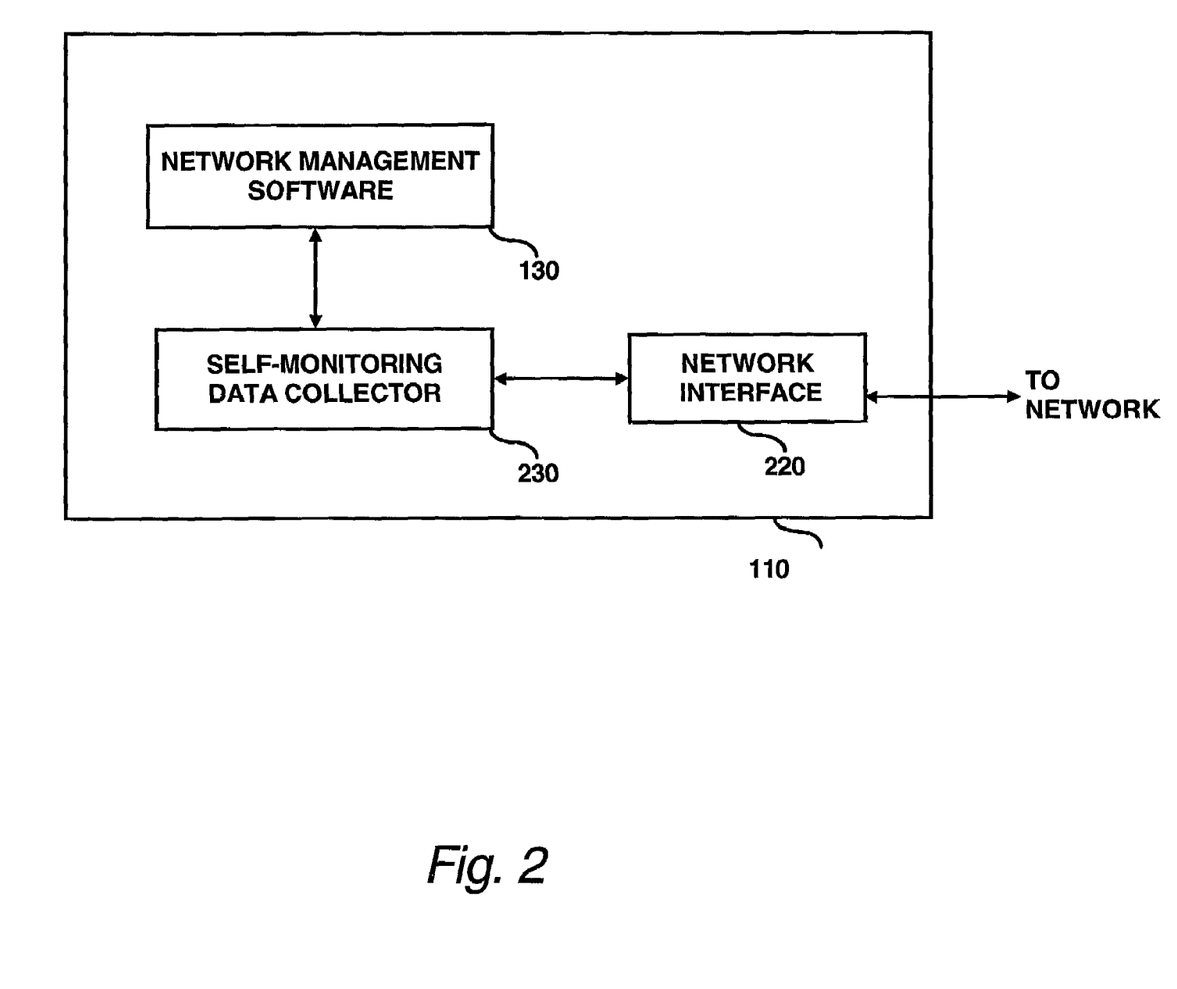
FIG. 2 illustrates a more detailed block diagram of the management node 110 utilizing an exemplary embodiment of the present invention.

FIG. 2 illustrates a more detailed block diagram of the management node 110 utilizing an exemplary embodiment of the present invention. In particular, the management node 110 includes the network management software 130. As discussed above, the capability of the management node 110 capabilities to monitor, troubleshoot and diagnose the computer network 140 may be implemented utilizing the network management software 130. As part of the monitoring function of the network management software 130, the network management software 130 may be configured to retrieve information from a remote device or node through a network interface 220 of the management node 110. The information may include status, transactional data, port data, address data, etc. The information may be collected and later analyzed by other network tools or functions to monitor and maintain a computer network.

The network management software 130 may implement the information retrieval from remote devices utilizing a self-monitoring data collection module 230. The self-monitoring data collection module 230 may be configured to retrieve information at scheduled times, e.g., a data collection event, from remote network devices to assist in the maintenance of a network.

The self-monitoring data collection module 230 may also be configured to provide a determination of whether a scheduled data collection event is behind a schedule of data collection intervals. The determination by the self-monitoring data collection module 230 may include ascertaining when the self-monitoring data collection module 230 is in a busy state. If the self-monitoring data collection module 230 is in the busy state, the self-monitoring data collection module 230 may be further configured to compare a current system time of the self-monitoring data collection module 230 with a last idle time of the self-monitoring data collection module 230. If the difference is greater than a user-determined time interval, the self-monitoring data collection module 230 may be further configured to notify an alert module to generate an alert or message to a user that the management node is busy. Alternatively, the self-monitoring data collection module 230 may be configured not to notify a user until the system has been "idle" for a period of time, e.g., an alert once every 24 hours. Otherwise, if the self-monitoring data collection module 230 is in an idle state, the self-monitoring data collection module 230 stores the current system time as an idle time.

Accordingly, a user may be alerted to the fact that a data collection configuration for a network management software may be overloading a network and that time-critical information may be not be collected at the appropriate times.

Figure 3:
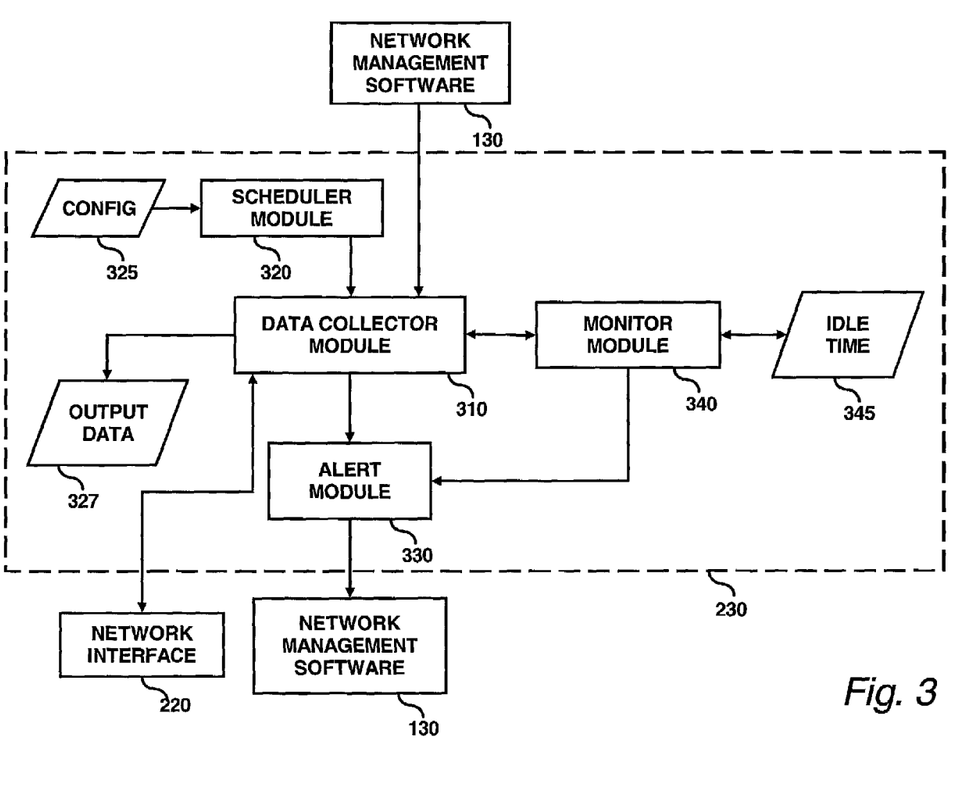
FIG. 3 illustrates a more detailed block diagram of the self-monitoring data collection module shown in FIG. 2 according to the principles of the present invention.

FIG. 3 illustrates a more detailed block diagram of the self-monitoring data collection module 230 shown in FIG. 2 according to the principles of the present invention. As shown in FIG. 3, the self-monitoring data collection module 230 may include a data collector module 310, a schedule module 320, an alert module 330 and a monitor module 340.

The data collector module 310 of the self-monitoring data collection module 230 may be configured to retrieve user-specified information from remote network devices at scheduled intervals, e.g., data collection interval, in response to a schedule of data collection interval from the scheduler module 320. The data collection module 230 may be configured to retrieve the user-specified information by opening up a communication channel, e.g., a socket, for each remote network device and querying the remote network device.

The scheduler module 320 of the self-monitoring data collection module 230 may be configured to provide to the data collector module 310 a list of remote devices to be polled or queried at a scheduled time according to a schedule of data collection interval. The schedule of data collection interval may be developed from a configuration file 325 by the network management software 130.

The configuration file 325 of the self-monitoring data collection module 230 may be configured to provide a list of remote devices to be polled, and for each remote device a corresponding periodic polling interval. The configuration file 325 may be further configured to be initialized during an invocation of the self-monitoring data collection module 230 by a user, e.g., a network manager. Alternatively, the configuration file 325 may be created off-line through a text editor.

After developing a schedule of the data collection interval, the scheduler module 320 may be further configured to notify the data collection module 310 a list of remote devices to be polled for a scheduled time, i.e., a data collection event. After collecting the user-specified information for the data collection event, the data collector module 310 may be further configured to forward the collected user-specified information to an output data file 327. The output data file 327 may be configured to be accessible to a user and/or other network tools of the network management software 130 for analysis.

However, as the data collector module 310 collects the user-specified information, the data collector 310 may be further configured to examine the collected user-specified information to determine if the user-specified information exceeds a user-selected limit. If an instance of the user-specified information exceeds a user-selected limit, the data collector module 310 may be further configured to notify an alert module 330, where the alert module 330 may be configured to generate a message to the network management software 130 that an instance of user-specified exceeded a user-selected limit.

As the data collector module 310 is collecting data, a monitor module 340 may be configured to monitor whether a current data collection event may be lagging behind the schedule of data collection interval by determining if the self-monitor data collection module 230 is busier longer than a user-defined busy interval. The monitor module 340 may be further configured to designate data or information received from a remote device as a busy state. As such, the monitor module 340 may be further configured to poll or query the data collection module 310 to determine if the data collection module 310 is receiving data from a remote device. In the event that the data collection module 310 is receiving data, the monitor module 340 compares a current system time of the data collection module 310 with a last idle time of the data collection module 310, where the last idle time may be stored in an idle time data file 345.

If the comparison of the current system time and the last idle time is greater than the user-defined busy interval, the monitor module 340 may be further configured to notify the alert module 330 to generate a message to a user of the network management software 130 that the data collection module 310 is busy and may be lagging behind in data collection from the remote devices.

Figure 4:
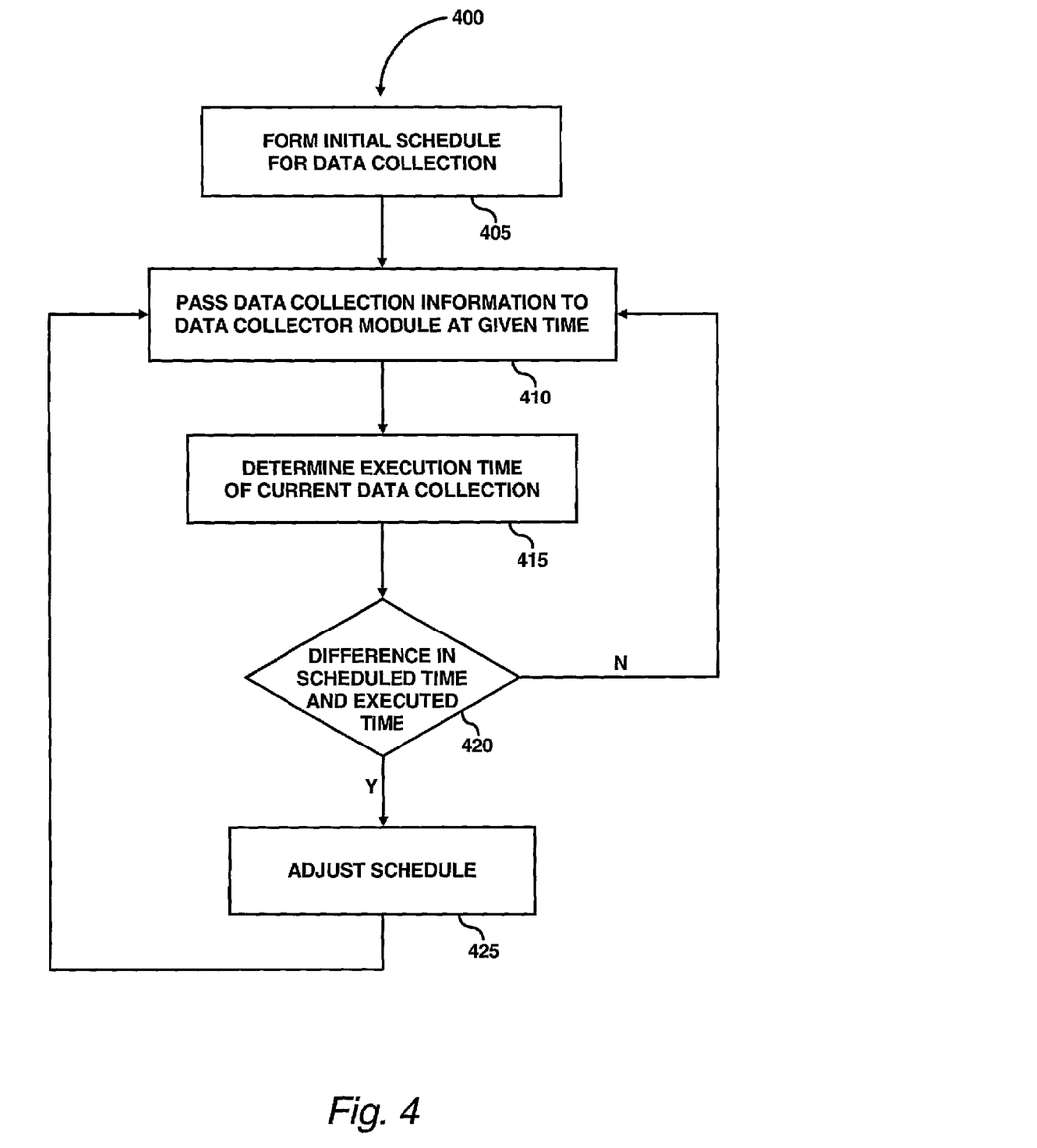
FIG. 4 illustrates a flow diagram of an exemplary embodiment of a scheduler module according to the principles of the present invention.

FIG. 4 illustrates a flow diagram 400 of an exemplary embodiment of a scheduler module 320 of the self-monitoring data collector module 230 according to the principles of the present invention. As shown in FIG. 4, the scheduler module 320 may be configured to form a schedule of data collection interval for polling remote devices based on the configuration file 325, in step 405. After the formation of the schedule of data collection events, the scheduler module 320 may be configured to notify the data collector module 310 of a list of remote devices to query for user-selected data at a scheduled time, in step 410.

In step 415, the scheduler module 320 of the self-monitoring data collector module 230 determines a current system time of a scheduled data collection event. From the current system time, the scheduler module 320 may be configured to compare the current system time and the scheduled data collection time, in step 420.

If there is a difference, the schedule module 320 of the self-monitoring data collector module 230 may be configured to adjust the initial schedule of the data collection interval to account for the delay, in step 425. Subsequently, the scheduler module 320 returns to step 410 for continued processing. Otherwise, if there is no difference from step 430, the scheduler module 320 may be configured to return to step 410 for continued processing.

Figure 5:
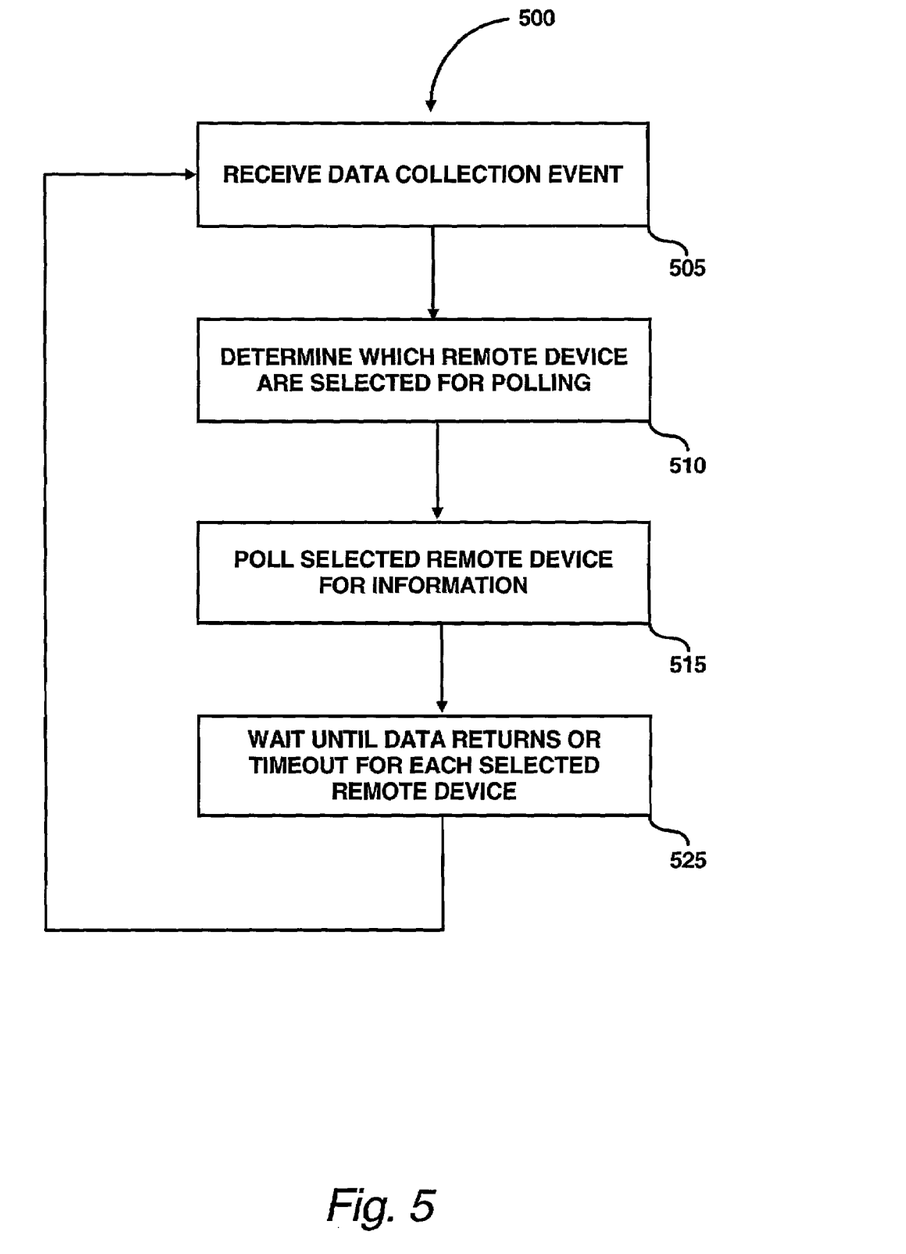
FIG. 5 illustrates a flow diagram of an exemplary embodiment of a data collector module of the self-monitoring data collector module according to the principles of the present invention.

FIG. 5 illustrates a flow diagram 500 of an exemplary embodiment of a data collector module 310 of the self-monitoring data collector module 230 according to the principles of the present invention. In particular, the data collector module 310 may be configured to receive a data collection event at a given time from the scheduler module 320, in step 505. The data collection event may include a list of remote devices to poll for user-specified information at the scheduled time. In step 510, the data collector module 310 determines from the data collection event which remote devices are to be polled for user-specified information.

As such, the data collector module 310 may be configured to open a communication channel, e.g., a socket, to each remote device listed in the data collection event and poll each initial remote device for the respective user-specified information, in step 515. Subsequently, the data collector module 310 may be configured to wait for the polled user-specified information or a time out for each opened communication channel, e.g., a socket, in step 525. In the event that the user-specified information is returned, the user-specified information is written to the output data file 327. Subsequently, when the data collection event is over, the data collector module 310 returns to step 505 for a next data collection event from the scheduler module 320.

Figure 6:
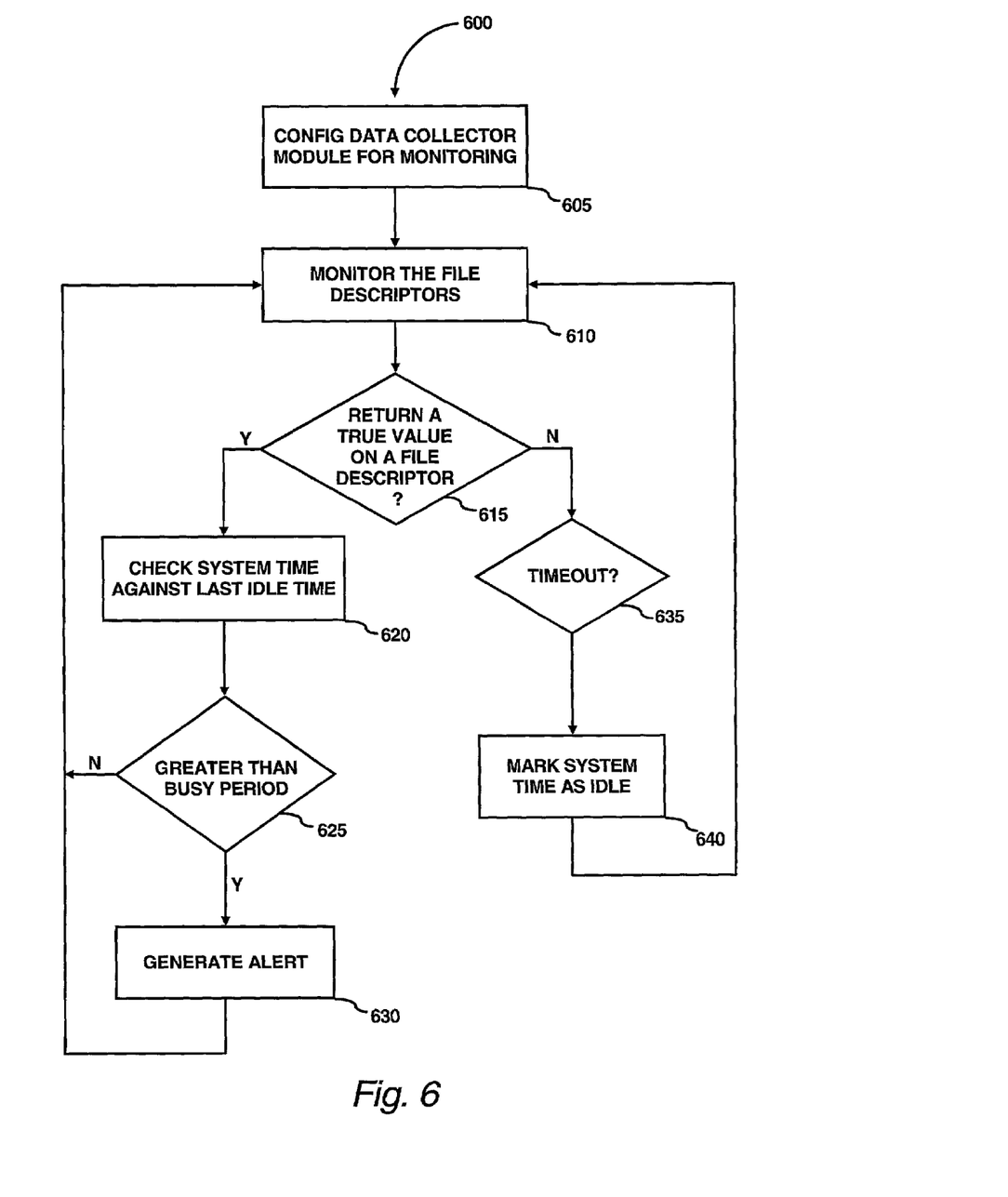
FIG. 6 illustrates a flow diagram of an exemplary embodiment of a monitor module of the self-monitoring data collector module according to the principles of the present invention.

FIG. 6 illustrates a flow diagram 600 of an exemplary embodiment of a monitor module 340 of the self-monitoring data collector module 320 according to the principles of the present invention. In particular, the monitor module 340 may be configured to examine the configuration file 325 to determine which remote network devices are to be monitored by the monitor module 340, in step 605. A data structure, e.g., "fd-set", may be configured to monitor a corresponding communication channel for each remote network device. The communication channel may be represented by a file descriptor, which is an endpoint of the connection between the management node 110 and a remote device.

In step 610, the monitor module 340 may be further configured to monitor the communication channels to the remote network devices by detecting whether the self-monitoring data collection module 230 is receiving any user-specified information from a remote network device. An exemplary method of detection may be implemented by blocking until an event occurs on the file descriptors created in step 605, e.g., a "select ( )" function call on the "fd_set". As such, the monitor module 340 may be further configured to sleep until a data return event.

In step 615, the monitor module 340 determines whether the data return event is user-specified information from a remote network device, which may represent a true value. If the data return event is the return of user-specified information from one of the remote network devices, i.e., a true value, the monitor module 340 may be configured to compare a current system time and a last idle time, which was previously stored in a previous data collection event, in step 620. If the monitor module 340 determines that the difference between the current system time and the last idle time is greater than a user-defined busy interval, in step 625, the monitor module 340 may be configured to notify the alert module 330 of the self-monitoring data collector module 230 to generate a message to a user that the self-monitoring data collector module 230 may be too busy as currently configured, in step 630. Otherwise, if the difference is not greater than the user-defined busy interval, the monitor module 340 returns to step 610 to continue monitoring the current data collection event.

Otherwise, if the data return event is a timeout, in step 635, the monitor module 340 determines the current system time and stores the current system time as the last idle time, in step 640. Subsequently, the monitor module 340 returns to step 610 to continue to monitor the data collection module 310.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for monitoring comprising:

collecting at least one instance of user-specified information;

assessing a state of said collecting as busy in response to a return of an instance of said information, and as idle in response to a timeout from said collecting;

determining if a difference between a current time of said busy state and a last idle time is greater than a predetermined busy interval;

generating an alert message in response to the difference being greater than the pre-determined busy interval; and storing said current time as said last idle time subsequent to said determining if a difference between a current time and a last idle time is greater than a busy interval.

2. The method for monitoring according to claim 1, further comprising:

providing an interface for a user to set said pre-determined busy interval.

3. The method for monitoring according to claim 1, wherein: said method of assessing comprises:

creating a file descriptor set for at least one remote node; and calling a function to determine a return value of said instance of information.

4. The method for monitoring according to claim 3, wherein: said method of assessing further comprises:

assessing said return value of said function; and determining said state of collecting as busy in response to said return value being true.

5. The method for monitoring according to claim 4, wherein: said function includes a select call function.

6. A method for monitoring a process of data collection, comprising:

assessing a state of said process of data collection;

assessing a state of said process of data collection as idle in response to a timeout from said data collection;

determining a current system time in response to said assessing of said state as busy;

determining if a difference between the current system time of said busy state and a last idle time is greater than a predetermined busy interval; and generating an alert message in response to the difference being greater than the predetermined busy interval; and storing said current time as said last idle time subsequent to said determining if a difference between a current time and a last idle time is greater than a busy interval.

7. The method for monitoring a process of data collection according to claim 6, wherein said assessing further comprises:
opening a communication channel;
polling a remote device;
waiting for information from said remote device; and
designating said state as busy in response to a detection of said information.

8. The method for monitoring a process of data collection according to claim 6, wherein said assessing further comprises:
opening a communication channel;
polling a remote device;
waiting for information from said remote device; and
designating said state as idle in response to a timeout of said waiting.

9. A system for monitoring comprising:
at least one processor;
a memory coupled to said at least one processor; and
a self-monitoring data collection module stored on said memory and executed on said at least one processor, wherein said self-monitoring data collection module is configured to collect at least one instance of user-specified information, assess a state of said collecting as busy in response to a return of an instance of said information, assess a state of said collecting as idle in response to a timeout from said collecting, determine if a difference between a current time of said busy state and a last idle time is greater than a predetermined busy interval, generate an alert message in response to the difference being greater than the pre-determined busy interval, and store said current time as said last idle time.

10. The system for monitoring according to claim 9, wherein said self-monitoring data collection module is further configured to assess said state of said collecting as idle in response to a timeout from said collecting, and to store said current time as said last idle time.

11. The system for monitoring according to claim 10, wherein said self-monitoring data collection module is further configured to provide an interface for a user to set said pre-determined busy interval.

12. The system for monitoring according to claim 9, wherein said self-monitoring data collection module is further configured to create a file descriptor set for at least one remote node, and to call a function to determine a return value of said instance of information.

13. The system for monitoring according to claim 9, wherein said function includes a select call function.

14. A computer readable storage medium on which is embedded one or more computer programs, said one or more computer programs implementing a method for monitoring said one or more computer programs comprising a set of instructions for:
collecting at least one instance of user-specified information;
assessing a state of said collecting as busy in response to a return of an instance of said information, and as idle in response to a timeout from said collecting;
determining if a difference between a current time of said busy state and a last idle time is greater than a predetermined busy interval;

generating an alert message in response to the difference being greater than the pre-determined busy interval; and storing said current time as said last idle time subsequent to said determining if a difference between a current time and a last idle time is greater than a busy interval.

15. The computer readable storage medium in according to claim 14, said one or more computer programs further comprising a set of instructions for:
assessing said state of said collecting as idle in response to a timeout from said collecting; and storing said current time as said last idle time.

16. The computer readable storage medium in according to claim 15, said one or more computer programs further comprising a set of instructions for: providing an interface for a user to set said pre-determined busy interval.

17. The computer readable storage medium in according to claim 16, said one or more computer programs further comprising a set of instructions for:
assessing said return value of said function; and
determining said state of collecting as busy in response to said return value being true.

18. The computer readable storage medium in according to claim 17, said one or more computer programs further comprising a set of instructions wherein said function includes a select call function.

19. A method for monitoring a data collection function in a network management node of a network also having at least one remote network device, comprising:
retrieving specified information from one or more of the at least one remote device at scheduled time intervals;
determining whether a scheduled data collection event is behind a schedule of data collection intervals, comprising:
ascertaining when the data collection function is in a busy state;
ascertaining that the data collection function is in an idle state in response to a timeout from said collecting;
determining, when the data collection function is in a busy state, a duration of time the data collection function has been in a busy state;
determining if the duration of time the data collection function has been in the busy state is greater than a predetermined busy interval;
generating a message when the duration of time the data collection function has been in the busy state is greater than the predetermined busy interval; and
storing said current time as said last idle.

20. The method of claim 19, wherein determining said duration of time the data collection function has been in a busy state comprises:
comparing, when the data collection function is in a busy state, a current system time of the scheduled data collection event with a last time the data collection function was idle.

21. The method of claim 20, wherein determining said predetermined busy time interval is user-defined.

22. The method of claim 20, wherein said determining a message comprises:
notifying an alert module to generate an alert or message to a user that that node in which the data collection function is being executed is busy.

23. The method of claim 19, wherein said retrieving information comprises:
  retrieving information from at least one of said at least one remote device at scheduled data collection intervals in response to a schedule of data collection intervals.

24. The method of claim 23, wherein said one or more remote network devices queried at each of said scheduled data collection intervals is identified in list of remote devices to be polled and a corresponding polling interval.

25. The method of claim 19, wherein said retrieving information comprises:
  opening up a communication channel for each of the one or more remote network devices; and
  querying the one or more remote network devices.

26. The method of claim 19, wherein the information is user-specified.

27. The method of claim 19, further comprising:
  forwarding the collected user-specified information to an output data file.

28. The method of claim 27, wherein said output data file is configured to be accessible b a user and or other network tools.

29. The method of claim 19, further comprising:
  comparing a current system time of the scheduled data collection event with the scheduled data collection time to determine whether said scheduled data collection event is delayed; and
  adjusting the initial schedule of the data collection interval to account for said delay, if any, in said scheduled data collection event.

* * * * *